Dec. 30, 1969  E. H. AUGUSTIN ET AL  3,486,876
COMPOSITE TWEEL FOR CHAMBER UTILIZED IN THE
MANUFACTURE OF FLOAT GLASS
Filed May 17, 1967  3 Sheets-Sheet 1
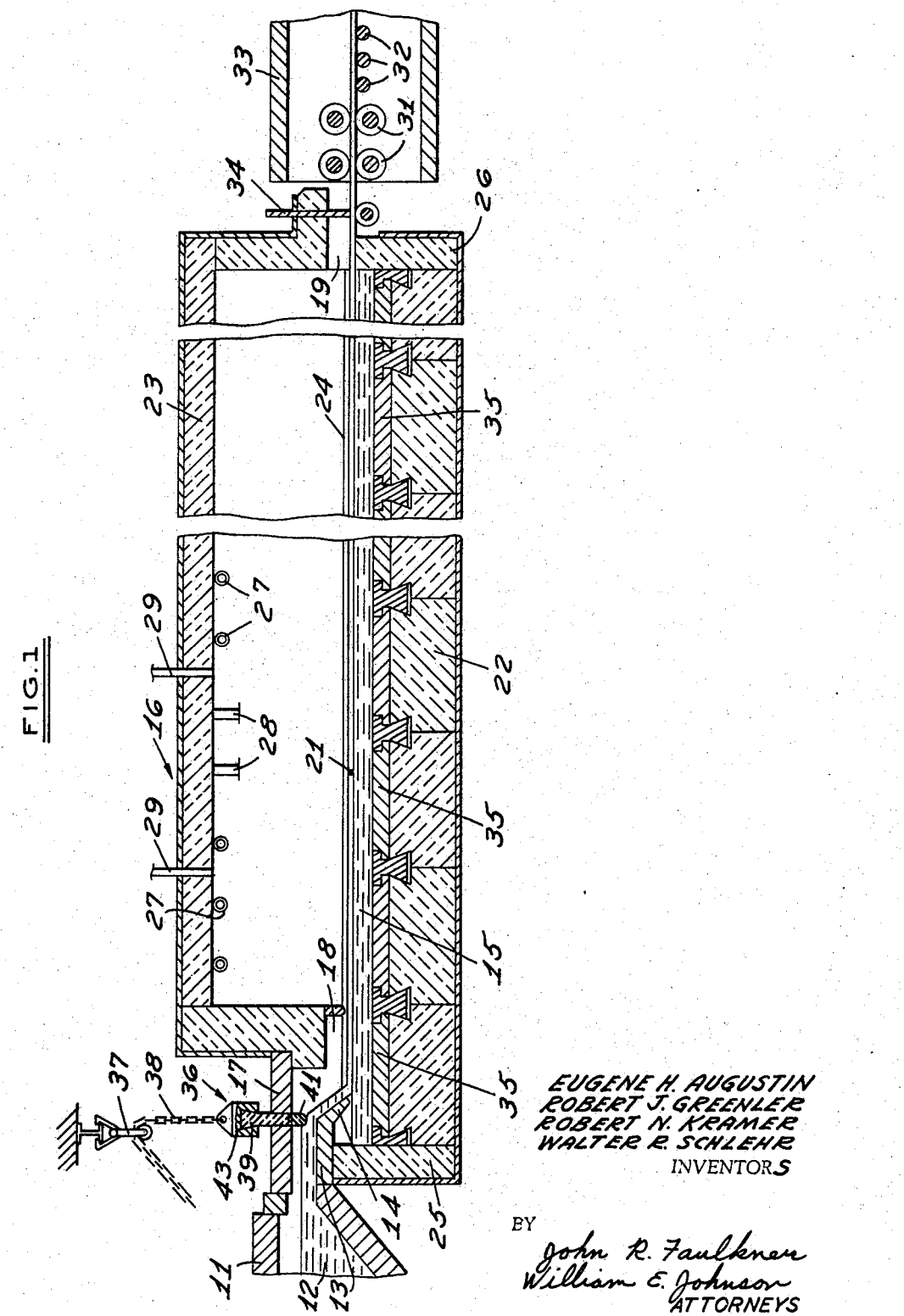
EUGENE H. AUGUSTIN
ROBERT J. GREENLER
ROBERT N. KRAMER
WALTER R. SCHLEHR
INVENTORS
BY
John R. Faulkner
William E. Johnson
ATTORNEYS

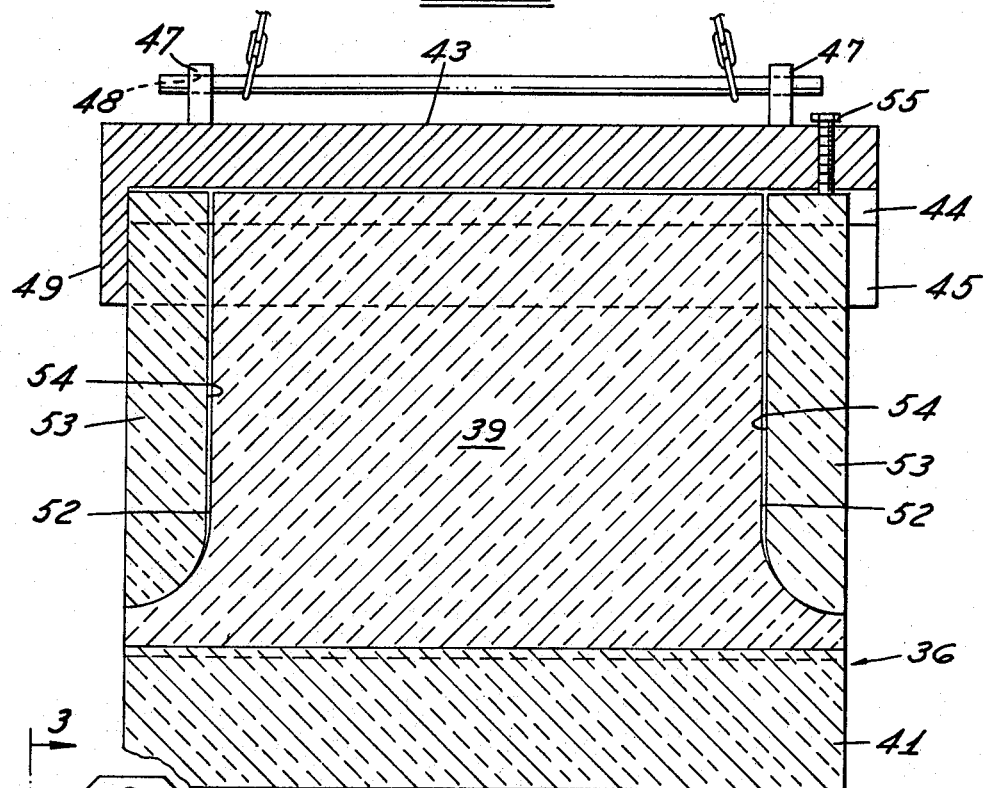
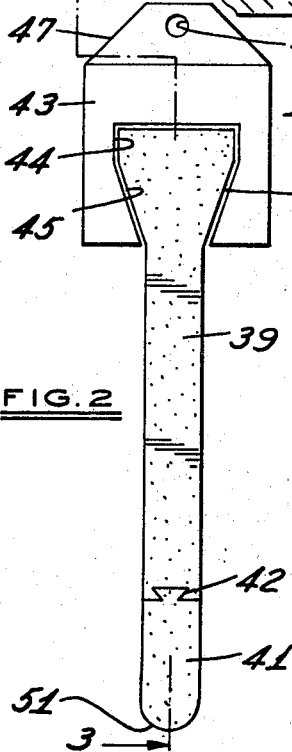
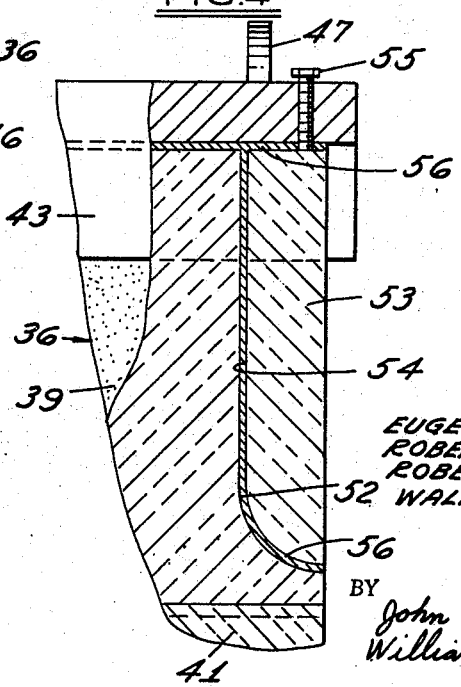

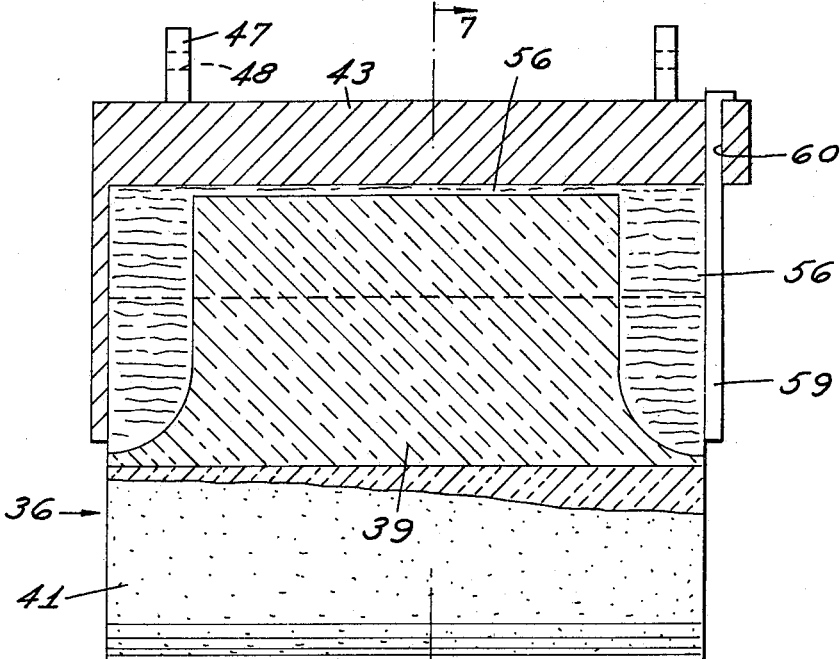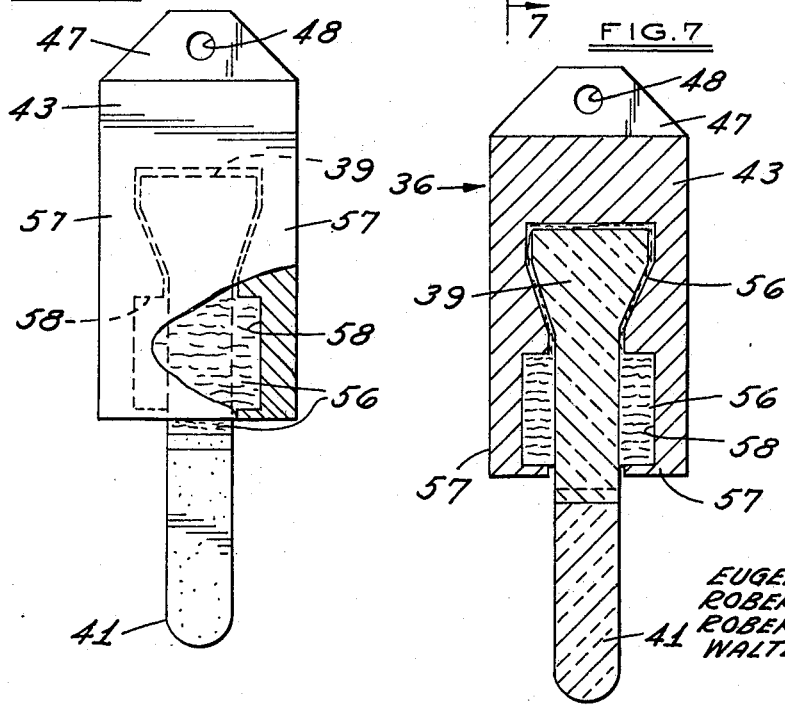

United States Patent Office 3,486,876
Patented Dec. 30, 1969

3,486,876
COMPOSITE TWEEL FOR CHAMBER UTILIZED IN THE MANUFACTURE OF FLOAT GLASS
Eugene H. Augustin, Dearborn Heights, Robert J. Greenler, Monroe, Robert N. Kramer, Dearborn Heights, and Walter R. Schlehr, Dearborn, Mich., assignors to Ford Motor Company, Dearborn, Mich., a corporation of Delaware
Filed May 17, 1967, Ser. No. 639,230
Int. Cl. C03b 5/30
U.S. Cl. 65—172                  7 Claims

ABSTRACT OF THE DISCLOSURE

A chamber containing a molten bath upon which molten glass is poured in order to produce glass by the "float process" is connected to a glass melting furnace by a forehearth and a spout. A tweel is movably mounted in the forthearth to regulate the flow of glass to the chamber. The upper portion of the tweel, which is generally positioned outside of the forehearth, has insulated sides so as to reduce thermally induced, stress cracking of the tweel. The lower portion of the tweel is made from a refractory material resistant to corrosion and to erosion by molen glass, while the upper portion is made from a refractory material resistant to thermal shock

BACKGROUND OF THE INVENTION

This invention relates to the manufacture of flat glass by the so-called "float process." In the "float process" molten glass is poured on the surface of a molten metal bath contained in a chamber to obtain a glass ribbon having true parallelism of its opposite surfaces and a lustrous, fire-polished surface finish.

Generally, the "float process" involves pouring molten glass on a molten bath so as to form or float a sheet or ribbon of glass on the surface of the molten bath. The molten bath has a density greater than that of glass. The glass is melted in a glass melting furnace and delivered through a forehearth onto a spout forming an extension of the forehearth. The spout, in turn, delivers the molten glass to the surface of the molten bath in the chamber thereby to form the glass ribbon. The glass ribbon is advanced along the surface of the bath under thermal conditions which permit the ribbon to harden sufficiently to allow safe removal thereof from the surface of the bath at the end of the chamber spaced from the spout.

The rate of delivery of the molten glass from the furnace to the molten bath in the chamber is controlled by a tweel. The tweel, which acts as a gate or closure member, is movably positioned such that at least a part thereof extends into the forehearth at a position near the spout. Since the tweel is movable, it may be lowered into the glass flowing along the forehearth to selected positions in order to meter the flow of glass to the molten bath in the chamber. More particularly, the tweel is vertically adjustable from a fully lowered position, which terminates the entire flow of glass to the bath, to various finite raised positions to meter the quantity of glass delivery in accordance with the requirements of the "float process."

In general, during the operation of the "float process" with tweels constructed in accordance with prior teachings, the end or bottom edge of the tweel, which is in contact with the molten glass flowing from the furnace to the bath, is subjected to the erosive and corosive action of the molten glass. Also, the portion of the tweel extending above and outside of the enclosed forehearth, has a tendency to crack at the outside edges thereof. Thus, the tweel structure of prior art teachings requires frequent replacement to prevent the tweel from reaching such a state of cracking that pieces of the refractory material defining the tweel would break loose therefrom and fall into the glass flowing therepast and thus be carried into the chamber containing the bath. The cracking of the edges of the tweel appears to be caused by the temperature profile across the tweel body. More particularly, when the tweel is in the operating position, an upper portion of the tweel is outside of the forehearth and the edges of this upper portion, because of exposure thereof to the ambient temperature, are cooler than the central section of the tweel. The cooler sides cause low compressive stresses in the center portion of the tweel and high tensile stresses along the top and edges thereof. Since refractory material is relatively weak in tension, the cracks originate at one or both sides of the tweel and these cracks rapidly traverse the entire width and length of the tweel to bring about the early failure thereof.

SUMMARY OF THE INVENTION

To overcome the disadvantages attendant the tweel structure of the prior art, a tweel of a composite construction has been invented. The tweel of this invention has a lower tweel section that is made from a refractory material highly resistant to corrosion and erosion by molten glass. The lower tweel section is detachably fastened to an upper tweel section which is manufactured from a refractory material that is mechanically strong and resistant to thermal shock. The lower tweel and upper tweel sections are so dimensioned that the lower tweel section is within and the upper tweel section is at least, in part, without the forehearth when the tweel is in its normal operating position in the forehearth. The side edges of the upper tweel section are insulated. This insulation reduces the loss of heat from the center of that section thereby minimizing the detrimental effects of a thermal gradient across the upper tweel section.

BRIEF DESCRIPTION OF THE DRAWINGS

FIGURE 1 is a diagrammatic, longitudinal section of a float glass chamber incorporating the tweel structure of this invention. FIGURE 2 is a side view of the tweel of this invention. FIGURE 3 is a vertical section taken along line 3—3 of FIGURE 2 showing, in detail, a preferred embodiment of the tweel of this invention. FIGURE 4 is a partial, frontal view of an alternate embodiment of the tweel of this invention, a portion of the tweel being broken away for the sake of clarity. FIGURE 5 is a view showing a longitudinal section of a tweel incorporating another embodiment of the tweel of this invention. FIGURE 6 is a side view of the tweel of FIGURE 5 with a portion thereof cut away. FIGURE 7 is a vertical section taken along line 7—7 of FIGURE 5.

DESCRIPTION OF THE PREFERRED EMBODIMENTS OF THIS INVENTION

Referring now to the drawings and in particular to FIGURE 1 thereof, a conventional glass melting furnace 11 is shown in which a constant level of glass 12 is maintained. The molten glass 12 is delivered through a forehearth 13 onto a spout 14 from which the glass flows onto the surface of a bath 15 of molten metal contained in a chamber 16. The forehearth 13 is enclosed by an enclosure 17 to prevent the entrance of outside atmosphere into both the chamber 16 and the furnace 11. The molten metal bath 15 has a density greater than that of the glass 12 so that the glass 12 will float on the surface of the bath 15.

By continuously feeding the molten glass 12 to an entrance opening 18 of the chamber 16 and by continuously withdrawing the floating glass at an exit opening 19 of the chamber 16, a continuous glass ribbon 21 is produced which floats on the molten bath 15. Preferably, the molten bath 15 is formed from molten tin.

The chamber 16 is formed by a lower refractory section 22, an upper refractory section 23, refractory side walls 24 (only one shown in FIGURE 1), and end refractory walls 25 and 26. These refractory walls and sections are joined together except for the entrance and exit openings 18 and 19, respectively, located in the end refractory walls 25 and 26. The side walls 24 and end walls 25 and 26 project above the top surface of the lower refractory section 22 and cooperate therewith to define a container for the molten bath 15.

To maintain the tin forming the bath 15 in a molten condition and the glass ribbon 21 at the proper temperatures required to form a ribbon of good optical quality, electrical heaters 27 are installed in the roof of the chamber 16 to maintain the temperature of the chamber. Coolers 28 also may be provided in selected zones of the chamber in order to assure that the glass ribbon 21 will be cooled and hardened sufficiently to be removed through the exit opening 19 without damage to the ribbon. The heaters 27, which are connected to a conventional power source (not shown), may be individually controlled and the coolers 28 can be positioned at suitable locations to provide the desired thermal gradient in the various zones of the chamber 16 to obtain the desired rate of cooling of the ribbon 21.

Preferably, the molten glass 12, flowing from the furnace 11, is introduced into the chamber 16 at a temperature of about 1850° F. The glass, which forms the ribbon 21, is progressively cooled by its passage through the chamber 16 to a temperature of about 1100° F. at the exit opening 19.

A gas is introduced into the chamber through inlets 29 to provide a protective atmosphere. The gas should be inert or reducing towards the components of the bath. Such gases as nitrogen and/or hydrogen have been used for this purpose.

The cooled glass ribbon 21 is withdrawn by driven traction rolls 31 onto a conveyor 32 to enter an annealing lehr 33 where the ribbon 21 is further cooled under controlled conditions to remove or reduce residual stresses therein.

The exit opening 19 of the end refractory wall 26 of the chamber 16 is preferably provided with a sealing structure 34. This structure is designed both to retain the protective gas atmosphere within and to prevent the entrance of outside atmosphere into the chamber.

A series of graphite slabs 35 may be installed in the bath 15 so as to cover the entire bottom area as well as line the side walls 24. The purpose of such slabs is to more uniformly distribute the heat of the bath across its width and also to protect the refractory in the event the glass ribbon 21 breaks during its passage through the chamber 16.

The rate of delivery of the molten glass 12 flowing from the furnace 11 to the chamber 16 is controlled by a tweel, generally identified by the numeral 36 (FIGURE 1). In accordance with the principles and teachings of this invention, the tweel 36 is supported from a hanger 37 by a chain 38 and is adjustable by movement of the chain to allow the tweel 36 to be raised or lowered as required. The novel tweel 36 of this invention is formed by an upper tweel section 39 and a lower tweel section 41, which sections may be formed integrally but preferably are formed by two different materials held together by a suitable structure such as a dovetail connection 42 (FIGURES 2 and 3).

The upper tweel section 39 of the tweel 36 is formed so that it is carried by a support 43. More particularly, the top portion of the upper tweel section is received in a slot 44 having downward tapered side walls 45. The upper tweel section has a sloping surface 46 on each side that engages the associated tapered surfaces 45 of the slot 44 to support the tweel 36. The support 43 has upwardly extending flanges 47 provided with holes 48 through which a tweel bar 50 is extended. The chain 38 is, in turn, hooked to the tweel bar. The support 43 may, in the preferred embodiment thereof, have a bracket 49 on one end thereof (FIGURE 3) to close off the end of the slot 44. A substantial portion of the upper tweel section 39 remains outside of the enclosure 17 (FIGURE 1) while all of the lower tweel section 41 extends inside the enclosure during normal operation of the "float process." In general, during normal operation of the process, the bottom edge of the lower tweel section is in contact with the molten glass 12 flowing from the forehearth 13 to the spout 14.

In accordance with the principles and teachings of the preferred embodiment of this invention, the lower tweel section 41 of the tweel 36 is provided with a smoothly ground radius 51 at the bottom edge thereof and a tenon at the upper edge (FIGURE 2). The tenon is received in a mortise in the bottom portion of the upper tweel section 39 and defines the dovetail connection 42 for the upper and lower tweel sections 39, 41.

As best seen in FIGURES 3 and 4, the upper tweel section has portions of its two side edges cut away to form alcoves 52 therein which are in part concavely shaped. A partially convexly shaped insulating block 53, contoured to correspond to the alcoves 52, is inserted in each alcove 52 but spaced slightly from the main body of the upper tweel section 39 to define a joint 54 therebetween. Each of the insulating blocks 53 also has a sloping surface 46 at its upper end whereby the block is receivable in the slot 44 of the support 43.

The main body of the upper tweel section 39 is made from a refractory material preferably highly resistant to thermal shock and mechanically strong. A material such as a porous, coarse grained, alumina fortified, mullite is suitable for forming the upper tweel section 39. Such a material may be either slip cast or pressed to form the section 39 and such a section would have a porosity in the general range of 18 to 22%. The material is resistant to thermal shock and mechanically strong because it is both made up of coarse grains and is relatively porous. A fused silica material may be utilized as an alternate material for forming the upper tweel section 39. However, a fused silica material would be soluble in molten glass and such might prove to be detrimental if the molten glass came into contact with the upper section during utilization thereof.

The lower tweel section 41 is made of a refractory material which is preferably highly resistant to erosion and corrosion attack thereupon by the molten glass. Suitable refractory materials for forming the lower tweel section 41 are a fused cast refractory of either alumina-zirconia-silica or fused alumina. These materials are melted in an electric furnace and cast into a mold in order to form the lower tweel section 41. The porosity of the materials after casting is in the general range of 0 to 1%. Because these cast refractory materials are so dense, they are highly resistant to the corrosion attack thereupon of molten glass. However, such materials are extremely sensitive to thermal shock. The bottom radius 51 can be diamond ground and smooth finished so that the lower tweel section 41 will not mark the glass it flows past the tweel.

The insulating blocks 53, which protect the side edges of the upper tweel section 39 from the ambient temperature, are made from a refractory material possessing good insulating properties. One such material would be a very porous fire clay having a density in the general range of 30 to 60 pounds per cubic foot. Such a fire clay material is made by mixing, for example, walnut shells with the fire clay material and then heating the combined mixture. The heating develops the ceramic bonds in the clay and burns out the walnut shells to leave voids whereby the fire clay material is extremely porous and a good insulator.

To assemble the tweel structure of this invention, one insulating block 53 is slid into the slot 44 of the support 43 until it engages the bracket 49. The main body of the upper tweel section 39, with the lower tweel section 41 attached thereto, is then inserted into the slot 44 followed thereafter by another or second insulating block 53. The second insulating block 53 is locked into place by a screw 55 extending through the support 43 to engage the block 54 and force the surfaces 46 thereof into engagement with the tapered side walls 45 of the support 43. To further enhance the insulating properties of the tweel 36 of this invention and to assure the retention of a space between the insulating blocks 53 and the main body of the upper tweel section 39, a compressible, insulating fiber material 56, such as Fiberfrax, a fused alumina silica fiber, is placed in the joints 54 and in the otherwise open portion of the slot 44 (FIGURE 4).

In FIGURES 5, 6 and 7, a further embodiment of tweel structure of this invention is depicted. In this embodiment, fibrous insulating material such as Fiberfrax 56 is used to encompass all sides of the upper tweel section 39. Utilization of such insulating material eliminates the use of solid insulating blocks 53 at the side edges of the upper tweel section 39.

In this particular embodiment, the support 43 is provided with an enclosure element 57 (FIGURES 6 and 7) that extends downward from the support 43 to enclose all sides of the upper tweel section 39. Two sides of the enclosure element 57 are provided with cavities 58 (FIGURE 7). The alcoves 52 and the cavities 58 are filled with the insulating material 56. To allow for the assembly of the tweel 36 to the support 43 by sliding the upper tweel section 39 into the slot 44, a sliding door 59 is provided which extends through an opening 60 at one end of the support 53 (FIGURE 5). Raising the door 59 will permit the insulation material 56 and the upper section 39 to be mounted in the support 43. The insulating material 56, which is compressible can be disposed in the slot 44 as well.

As can be readily understood from the description, this invention provides a novel tweel structure which has its upper tweel section enclosed at least on the side edges thereof by insulation so that the edges of the upper tweel section are insulated from the ambient temperature conditions. By not utilizing such insulation, the center section of the upper tweel section 39 remains substantially hotter than the side edges thereof because a substantial amount of heat is lost from the non-insulated side edges. By insulating at least the side edges of the exposed upper tweel section 39, heat loss is reduced and normal shrinkage of the side edges of the tweel is minimized. Thus, cracking of the upper section 39 of the tweel is nearly entirely eliminated. The joint 54 and insulating material 56 absorb the expansion which still may occur. A radiation shield located about the entire exposed portion of the tweel would function in a similar manner in that it would reduce the heat loss from the exposed side edges of the tweel.

Due to the long life of the improved tweel 36, it is preferred to use a two part construction so that the lower tweel section 41, subject to the continuous corrosive and erosive action of the molten glass 12, can be replaced. The mortise-tenon dovetail connection 42 allows for readily attaching and detaching the lower tweel section 41 to the upper tweel section 39.

What is claimed is:

1. A tweel for controlling the rate of flow of molten glass from a glass melting furnace to a molten bath contained in a chamber utilized in the manufacture of flat glass, the furnace and chamber being connected by a forehearth and a spout, the tweel comprising: an upper tweel section; a lower tweel section secured to said upper tweel section; said lower and upper tweel sections being so dimensioned that said lower tweel section is within and said upper tweel section is at least, in part, without the forehearth when the tweel is in a normal operating position with respect to the forehearth; heat insulating means substantially juxtaposed to at least the side edges of said upper tweel section for reducing the heat loss from said upper tweel section, and means engaging the top portion of said upper tweel section for supporting said tweel when said tweel is positioned in a normal operating position with respect to the forehearth.

2. The improved tweel for controlling the rate of flow of molten glass from a glass melting furnace as defined in claim 1 wherein: said heat insulating means is in engagement with said side edges of said upper tweel section; said upper tweel section is made from a refractory material mechanically strong and resistant to thermal shock; and wherein said lower tweel section is made from a refractory material resistant to both the erosion and the corrosion effected by contact thereof by molten glass flowing thereby.

3. The improved tweel for controlling the rate of flow of molten glass from a glass melting furnace as defined in claim 2 wherein: said heat insulating means are insulating refractory blocks in juxtaposition to the side edges of said upper tweel section.

4. The improved tweel for controlling the rate of flow of molten glass from a glass melting furnace as defined in claim 3 wherein: said insulating refractory blocks are also supported by said means for supporting said upper tweel section.

5. The improved tweel for controlling the rate of flow of molten glass from a glass melting furnace as defined in claim 4 wherein: said side edges of said upper tweel section are concavely shaped so as to define alcoves; wherein said insulating refractory blocks are convexly shaped and received in said alcoves but spaced from said side edges of said upper tweel section; and wherein the spaces between said insulating refractory blocks and said side edges of said upper tweel section are filled with a compressible insulating material to allow for expansion of said upper tweel section.

6. A tweel for controlling the rate of flow of molten glass from a glass melting furnace to a molten bath contained in a chamber utilized in the manufacture of flat glass, the furnace and chamber being connected by a forehearth and a spout, the tweel comprising: an upper tweel section; a lower tweel section secured to said upper tweel section; said lower and upper tweel sections being so dimensioned that said lower tweel section is within and said upper tweel section is at least, in part, without the forehearth when the tweel is in a normal operating position with respect to the forehearth; support means for supporting said upper tweel section when in its normal operating position; enclosure means extending from said support means to a position surrounding at least, but spaced from, the edges of said upper tweel section; and insulating material disposed between the sides of said upper tweel section and said enclosure means for reducing the heat loss from the tweel.

7. A tweel for controlling the rate of flow of molten glass from a glass furnace to a molten bath contained in a chamber, the furnace and chamber being connected by a forehearth and a spout, the tweel comprising: a body of refractory material defining the tweel, said body dimensioned so that at least a portion of said body is without the forehearth when the tweel is in a normal operating position with respect to the forehearth; and heat insulating means substantially juxtaposed to at least the side edges of the portion of said body outside of the forehearth for reducing heat loss from the tweel.

References Cited

UNITED STATES PATENTS

| | | | |
|---|---|---|---|
| 1,920,692 | 8/1933 | Halbach | 65—343 |
| 2,677,003 | 4/1954 | Arbeit et al. | 65—374 |
| 3,137,559 | 6/1964 | Van Pract | 65—343 |
| 3,183,072 | 5/1965 | Long | 65—333 |
| 3,351,452 | 11/1967 | Robinson | 65—182 |
| 3,445,217 | 5/1969 | Dickinson et al. | 65—172 |

S. LEON BASHORE, Primary Examiner

E. R. FREEDMAN, Assistant Examiner

U.S. Cl. X.R.

65—65, 99, 182, 345, 374